US005686909A

United States Patent [19]
Steinhauser

[11] Patent Number: 5,686,909
[45] Date of Patent: Nov. 11, 1997

[54] ALARM SYSTEM FOR BOAT COVERS AND AUTOMOBILE CONVERTIBLE TOPS

[76] Inventor: Louis P. Steinhauser, 2448 Cripple Creek, St. Louis, Mo. 63129

[21] Appl. No.: 658,697

[22] Filed: Jun. 5, 1996

[51] Int. Cl.$^6$ ............................................. G08B 23/00
[52] U.S. Cl. ......................... 340/984; 340/426; 340/652
[58] Field of Search ............................ 340/426, 425.5, 340/984, 652; 296/100; 114/361

[56] References Cited

U.S. PATENT DOCUMENTS

| | | | |
|---|---|---|---|
| 4,222,032 | 9/1980 | Speer | 340/426 |
| 4,253,084 | 2/1981 | Topputo | 340/572 |
| 4,367,454 | 1/1983 | Modica | 340/426 |
| 4,698,615 | 10/1987 | Wilber | 340/568 |
| 4,785,743 | 11/1988 | Dalphin | 109/40 |
| 4,810,999 | 3/1989 | Moshier | 340/550 |
| 4,929,925 | 5/1990 | Bodine et al. | 340/426 |
| 5,059,945 | 10/1991 | Scheele et al. | 340/426 |
| 5,089,807 | 2/1992 | Shim | 340/636 |
| 5,289,785 | 3/1994 | MacPherson et al. | 340/550 |

Primary Examiner—Jeffery Hofsass
Assistant Examiner—Mark S. Rushing
Attorney, Agent, or Firm—Herzog, Crebs & McGhee, LLP; Matthew A. Rosenberg

[57] ABSTRACT

An alarm system for boat covers is shown which deters the removal or the slicing of said cover. A perimeter circuit embedded into the hem of the cover is used in conjunction with specially adapted snap receptacles for cover removal protection. When snapped, the specially adapted snap receptacles act as closed switches in the perimeter circuit, and when unsnapped they act as open switches in the perimeter circuit. The cover is protected from slicing by circuitry affixed thereto. In the preferred embodiment a conduction grid made of a high-resistance material is affixed to the cover. A microprocessor constantly monitors the resistance and trips the alarm when the resistance substantially changes. The microprocessor is also capable of detecting resistance changes in the perimeter circuit if high-resistance wire is used for that circuit. In an alternative embodiment, wire electrical circuits are affixed to the surface of the boat cover. The system may also be adapted for use on convertible automobile covers by simply removing the perimeter circuit.

21 Claims, 5 Drawing Sheets 5,686,909

ALARM SYSTEM FOR BOAT COVERS AND AUTOMOBILE CONVERTIBLE TOPS

BACKGROUND OF THE INVENTION

This invention relates to alarm systems, and more particularly, to an alarm system for boat covers and convertible automobile tops.

Boat owners are often easy prey for thieves due to the lack of a good security system that can be used in conjunction with a standard canvas type boat cover. During a typical outing, boat owners will normally put much of their expensive equipment such as fishing, skiing, or other gear into the boat wherein only a flimsy canvas boat cover stands between that gear and a thief. A thief could easily remove the cover or slice it open with a knife to get at the boat owner's valuables. In most instances, such gear will not fit into the towing vehicle nor is there a "safe" storage compartment on or within the boat itself, thereby necessitating the unsafe storage of the gear in the boat.

Few alarm systems in the prior art have been designed specifically for adaptation to boat covers or similar items. U.S. Pat. No. 4,698,615 to Wilber discloses an alarm adapter for canvas boat covers. In Wilber, a cord is hooked on one end to a canvas boat cover and the other end is clamped to a plunger switch, which actuates the alarm if pulled. No protection is gained from a thief who unhooks the cords, jumpers the alarm circuit, or cuts the cover open.

Hence, prior art alarm systems left many security holes which could be exploited by thieves with fairly unsophisticated means. The boat owner is thus caused a great deal of anxiety when he leaves the boat unattended. He must try to keep the boat in sight as often as possible. At night, the boat owner has to make the decision of how much equipment to drag with him to his sleeping accommodations.

The same considerations exist for owners of convertible automobiles. Unlike with hard-top automobiles, potential thieves can quickly gain access to the interior of convertible automobiles by slicing the soft top. The same is true with soft covers for the beds of pickup trucks.

It is thus an object of this invention to provide an alarm system for boat covers and convertible automobile tops which deters potential thieves from slicing or removing the cover or top to gain access to valuables.

It is a further object of this invention to provide an alarm system as above which cannot be defeated by placing jumpers on the alarm circuits.

SUMMARY OF THE INVENTION

The present invention is a cover alarm system especially adaptable to canvas boat covers and soft automobile tops such as convertibles, that notifies an owner of the removal or slicing thereof. The alarm system includes electrical circuitry, associated power, monitoring and warning devices that cooperatively operate to warn the owner when the electrical circuitry is broken, open-circuited, or the circuit resistance is otherwise altered. In a less sophisticated version, the alarm system only monitors the electrical circuitry for discontinuity or breaks to trigger an alarm condition. In a sophisticated version, the resistance of the electrical circuitry is discretely monitored in order to prevent the possibility of using electrical jumpers to defeat the alarm.

In one form thereof, the present alarm system deters removal of a boat cover by a perimeter electrical circuit embedded in the hem. The perimeter electrical circuit extends through specially modified snap receptacles positioned in and around the cover. The snap receptacles act as switches which are closed when the male portion of standard snaps are inserted therein, and open when the male portion of the snap is removed. A standard alarm monitoring device coupled to the perimeter electrical circuit detects any open circuit condition or break in the continuity of the circuit. Thereafter, various types of warning devices may be triggered by the monitoring device.

Additionally, the perimeter electrical circuit may be coupled to a resistance monitoring device that detects threshold changes in the resistance of the electrical circuit to trigger an alarm condition. In this embodiment, each time the alarm system is turned on, the resistance of the electrical circuit is measured to calibrate the system and provide a baseline resistance level or value. Thereafter, changes in the resistance are checked against the baseline valve. Upon encountering a threshold change, the alarm is triggered. This reduces the ability of the thief or vandal to use jumpers to defeat the alarm.

In another form thereof, the alarm system deters the slicing of the boat cover by providing an electrical circuit grid disposed throughout the area of the cover. The electrical circuit grid may be one continuous circuit or may be comprised of a plurality of electrical circuits. The less sophisticated version monitors the continuity of the circuit (s) to trigger the alarm upon a break.

The preferred embodiment of the circuit grid uses a microprocessor in conjunction with a high-resistance conductive grid. The boat cover is lined with a conductive grid made of a network of wires or a high-resistance thick film coating. Electrodes are placed around the outside of the conductive grid. A control box with a microprocessor monitors the resistance between the electrodes and triggers the alarm when a significant change is noticed between any two electrodes. Then, in addition to detecting opened circuits, the system can detect when a circuit has been jumpered with a typical conductive wire, such as copper.

In a less expensive version, the electrodes and the thick film lining are replaced with a series of conventional electrical circuits. Some of the circuits are run back and forth over the entire area of the boat cover, while other circuits are run perpendicular to the first circuits to provide maximum protection. The perpendicular circuits prevent the thief from making a long incision in the cover between the wires. When any of those circuits are cut, including the perimeter circuit if additionally utilized, the alarm is tripped.

Either embodiment of the electrical circuit may be adapted for use on a convertible automobile top. The perimeter circuit would be removed for convertible automobiles whereon the top is moved in and out of place by a motor, thereby not using snaps.

BRIEF DESCRIPTION OF THE DRAWINGS

The above-mentioned and other features, advantages and objects of this invention, in the manner in which they are obtained, will become more apparent and will be best understood by reference to the detailed description in conjunction with the accompanying drawings which follow, wherein.

DETAILED DESCRIPTION

Figure 1:
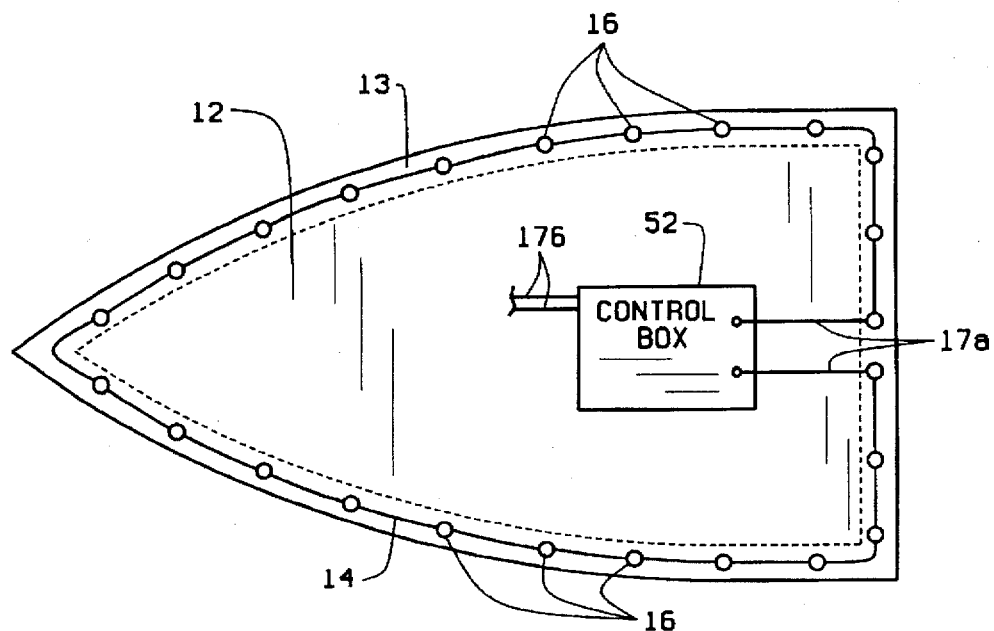
FIG. 1 is a boat cover showing a schematic diagram of the perimeter circuit and snaps.

Accordingly, a boat cover 12 with a perimeter circuit 14 of an alarm system 10 (See FIG. 6) is shown in FIG. 1. The perimeter circuit 14 is embedded into the hem 13 of the boat cover 12 and extends the entire perimeter thereof. The perimeter circuit 14 is made of an electrical conductor such as copper wire. However, it is preferable that the perimeter circuit 14 be made of a high-resistance electrical conductor or wire. If a high-resistance wire is used, the alarm system 10 may be configured to trigger if the perimeter circuit 14 is jumpered using a typical low-resistance wire as detailed hereinbelow. Specially adapted snap receptacles 16 are placed around the perimeter circuit 14 and act as switches. When the snap receptacle 16 is snapped on to a standard male portion 28 of a snap (FIG. 2), the switch is closed and the perimeter circuit 14 has continuity. When the snap receptacle 16 is removed, the switch is open, hence the alarm system 10 activates an alarm.

Figure 2:
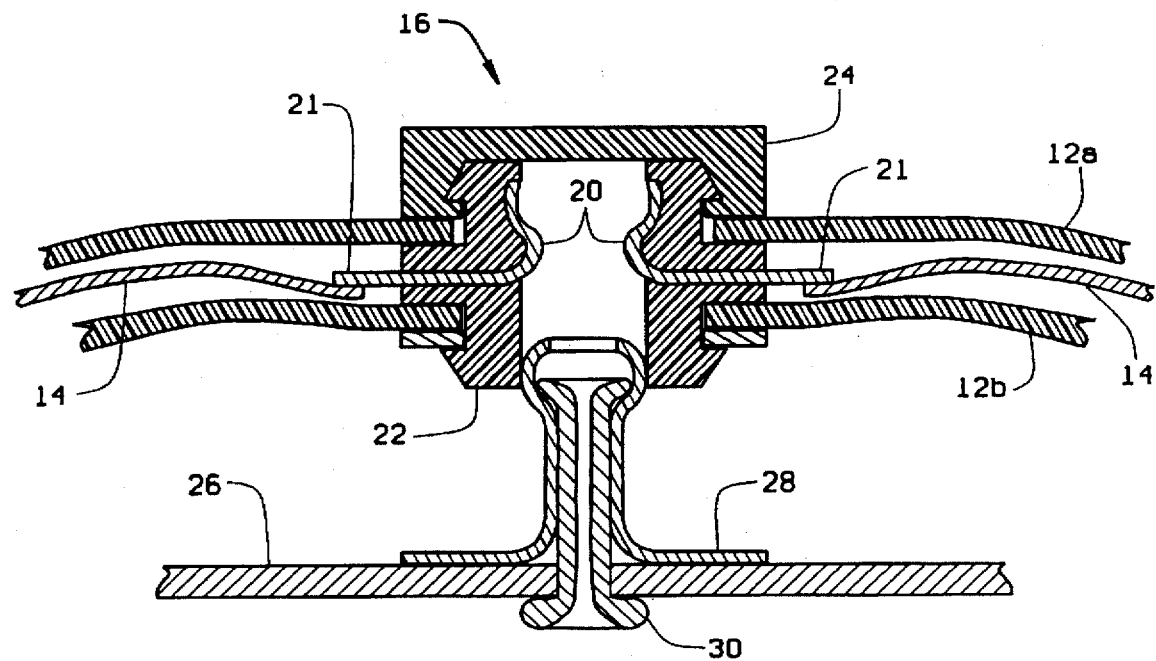
FIG. 2 is an enlarged cross sectional view of the perimeter circuit in the general location of a snap.

As shown in FIG. 2, the specially adapted snap receptacle 16 is created by molding electrical contacts 20 into a snap body 22 made of a polymer or other electrically insulating material. It is preferable that the contacts 20 be made of a high resistance material, similar to the perimeter circuit 14, to further thwart attempts to jumper the perimeter circuit 14 at the contacts 20. The receptacle 16 is secured to upper and lower folds 12a and 12b of the hem 13 of the boat cover 12 using a snap cover 24. The perimeter circuit 14 achieves electrical continuity through each snap receptacle 16 by connecting the perimeter circuit 14 to the portion 21 of the contact 20 protruding from the snap receptacle 16. When the two contacts 20 are bridged by the male portion 28 of the snap, electrical circuit continuity is achieved through the snap receptacle 16 causing it to act as a closed switch for the perimeter circuit 14. When the receptacle 16 is pulled from the male portion 28, the perimeter circuit 14 is opened and thus looses continuity.

The male portion 28 of the snap can be of any type known to the art made of an electrically conducting material. The male portion 28 of the snap can be attached to the boat hull 26 using any conventional means. Shown is a male portion 28 of the snap attached to the boat hull 26 with a rivet 30. The male portion 28 must be made of an electrically conducting material since it acts as a bridge, closing the switch and the circuit. In the case of boats with metal hulls or convertible automobiles with metal bodies, the male portion 28 of the snap would have to be insulated from the hull or body, respectively, by making the rivet 30 of an insulating material and adding an insulating washer (not shown) between the male portion 28 of the snap and the hull or body 26.

The perimeter circuit 14 described above is electrically coupled with leads 17a extending from the male portion 28 of two adjacent snaps 16 to an alarm system control box 52 that can be a standard alarm monitoring and alarm such as that commonly used in car or home burglar alarms. The alarm system control box 52 monitors the perimeter circuit 14 for discontinuity, i.e. breaks or open-circuits, and sends an alarm signal to the alarm that warns the owner, by means such as a local audible alarm, a personal pager, or both. It would also be possible to have the system monitored by a central alarm monitoring agency. By someone unsnapping the boat cover, discontinuity is produced thereby triggering the alarm.

The alarm system control box 52 is located under the cover 12, inside the boat hull 26, and coupled via leads 17b to a battery (not shown) possibly through an adapter such as a cigarette lighter. The alarm control system box 52 includes a key switch (not shown), remote control (not shown) or other secure on-off switch to arm and disarm the alarm system. If a key switch is used, it is preferable to keep the switch within the confines of the hull 26 and cover 12 with a short delay mechanism to allow the operator time to finish covering the boat; similarly the delay mechanism would have to give the operator a short amount of time to disarm the system after accessing the key switch. For this reason, it is preferable to use a remote arming device.

After the cover is snapped onto the boat, the perimeter circuit 14 will be continuous. At this point, the alarm system is activated by the user (or just prior thereto if using a key switch). The alarm system control box 52 activates an audio, visual or remote control alarm by producing an alarm signal when one or more snaps are disengaged thereby creating the discontinuity in the perimeter circuit 14. Instead of just monitoring discontinuity, the alarm control system box 52 may be an active system that periodically samples and measures the electrical resistance of the perimeter circuit 14. The alarm would sound based on changes in the resistance valves of subsequent samples. This is detailed hereinbelow with reference to another form of the present invention.

Figure 3A:
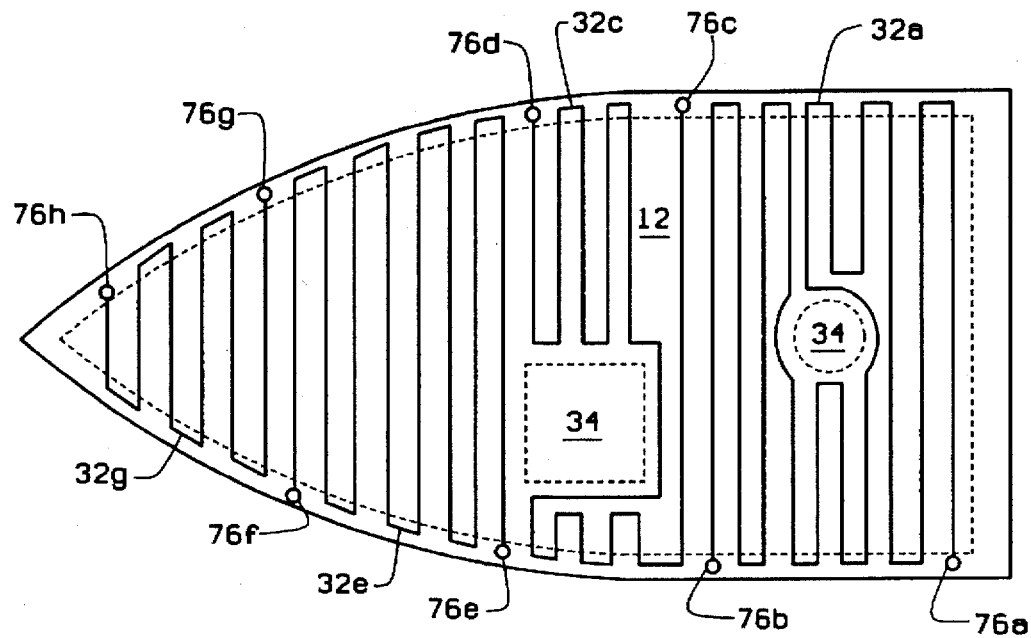
FIG. 3A shows the boat cover with a typical layout of a plurality of circuits running the width of the cover, the layout configured for continuity monitoring only.
Figure 3B:
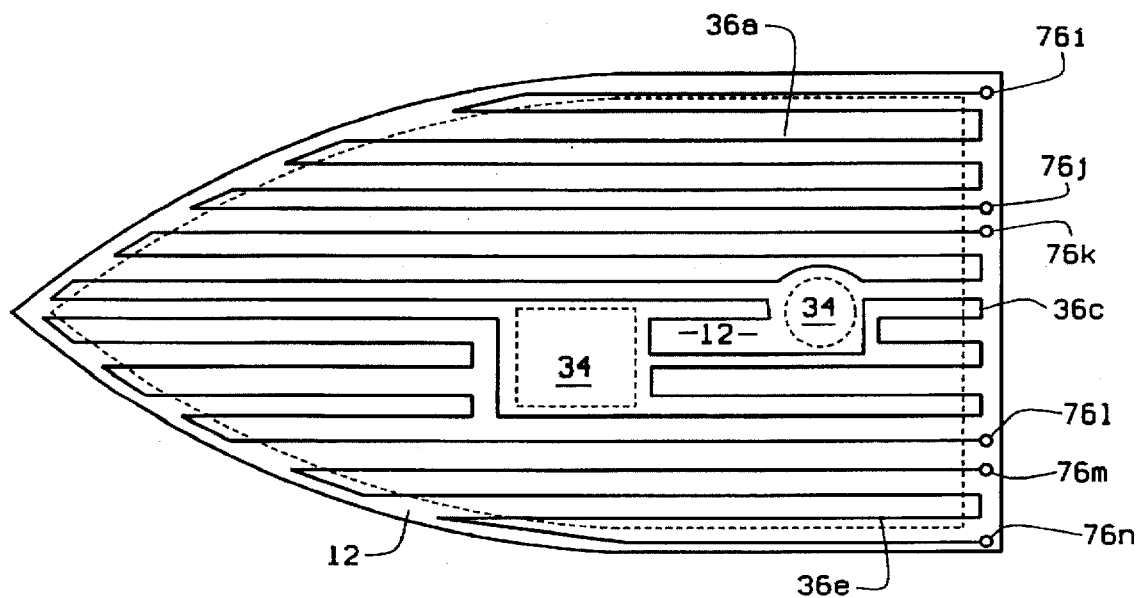
FIG. 3B shows the boat cover with a typical layout of a plurality of circuits running the length of the cover, layout configured for continuity monitoring only.

The perimeter circuit 14 serves as a cover removal alarm. In conjunction with the cover removal protection or separate therefrom, one form of the present invention provides a cover slicing alarm. FIGS. 3A and 3B show two possible layouts for surface or area cover alarm circuits that sense slicing of the cover by detecting discontinuity in the circuit or circuits. Referring to FIG. 3A, a plurality of circuits 32a, 32c, 32e, and 32g are run back and forth over the entire area of the boat cover 12 and preferably affixed to a surface of the boat cover 12. It should be understood that there may be only one circuit rather than many. The one circuit may be seen in the same pattern as that shown in FIGS. 3A and 3B, but connected via only two terminals to the control system.

Each circuit 32a, 32c, 32e, and 32g of FIG. 3A is respectively coupled to terminal pairs 76a, 76b; 76c, 76d; 76e, 76f; and 76g, 76h. The terminals should be coupled to the alarm control system. In this manner, when either of the circuits is slit, the alarm will sound. Again, when only one continuous circuit is used, only one terminal pair would be used.

Optionally, or separately, additional circuits 36a, 36c, and 36e as shown in FIG. 3B may also be run back and forth over the entire area of the boat cover 12. These circuits 36a, 36c, and 36e are respectively coupled to terminal pairs 76i, 76j; 76k, 76l; and 76m, 76n. If additional circuits 36a,c,e are used, they should be run approximately perpendicular to the first set of circuits 32a,c,e,g to ensure maximum protection.

The use of the perpendicular additional circuits 36a,c,e prevents someone from making an incision parallel to the loops or passes of circuits 32a,c,e,g over the boat cover 12. In the same manner as in FIG. 3A, each circuit 36a,c, and e is respectively coupled to terminal pairs 76i, 76j; 76k, 76l; and 76m, 76n. If only one circuit is used, it does not matter significantly whether it is run parallel or perpendicular to the long axis of the boat cover. In fact, it is possible to run the same circuit first in one direction and then in the perpendicular direction. If certain areas of the boat cover 12 will be subjected to frequent abrasions, these areas may be bypassed by the circuits 32a,c,e,g, and 36a,c,e, and covered with padding 34. Obviously only the areas covered by the circuits will be protected from slicing.

Figure 4A:
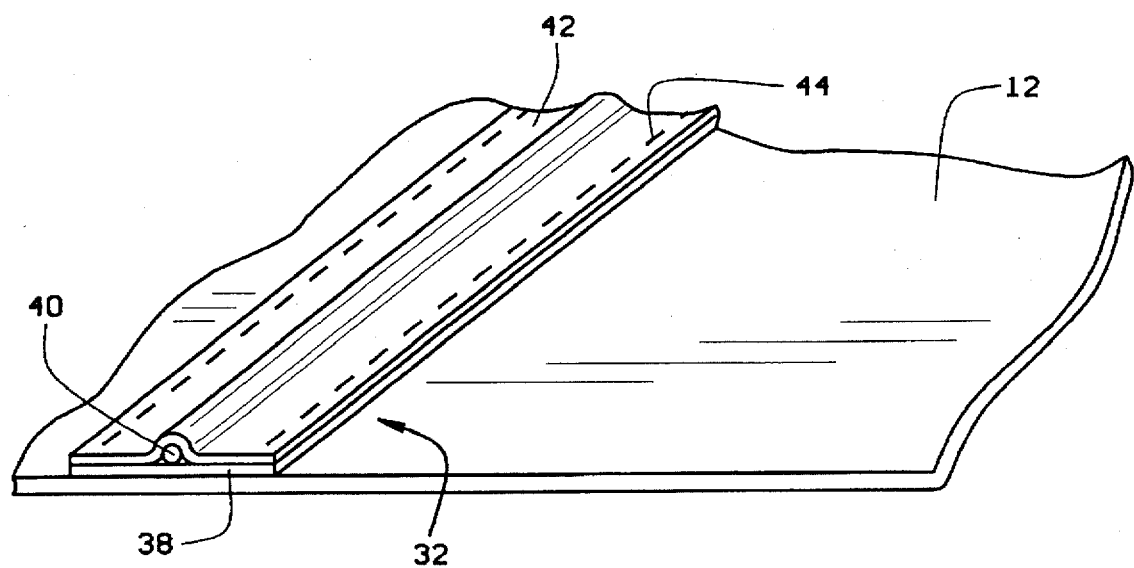
FIG. 4A shows an enlarged isometric cutaway of a typical circuit utilizing a conductive wire.

The circuits 32a,c,e,g and 36a,c,e, may be configured and affixed to the surface of the boat cover 12 using any number of methods. Shown in FIG. 4A is one method involving an adhesive element or strip 38 with adhesive or bonding qualities on both surfaces. One surface of the adhesive element 38 is affixed to the surface of the boat cover 12 and a conduction element 40 is placed on the opposite surface of the adhesive element 38. The conduction element 40 and the exposed portion of the adhesive element 38 are then covered with an electrically insulating and preferably abrasion resistant layer 42 which is preferably made of an abrasion resistant material. Optional stitching 44 may be used to increase the life span of the system.

Figure 4B:
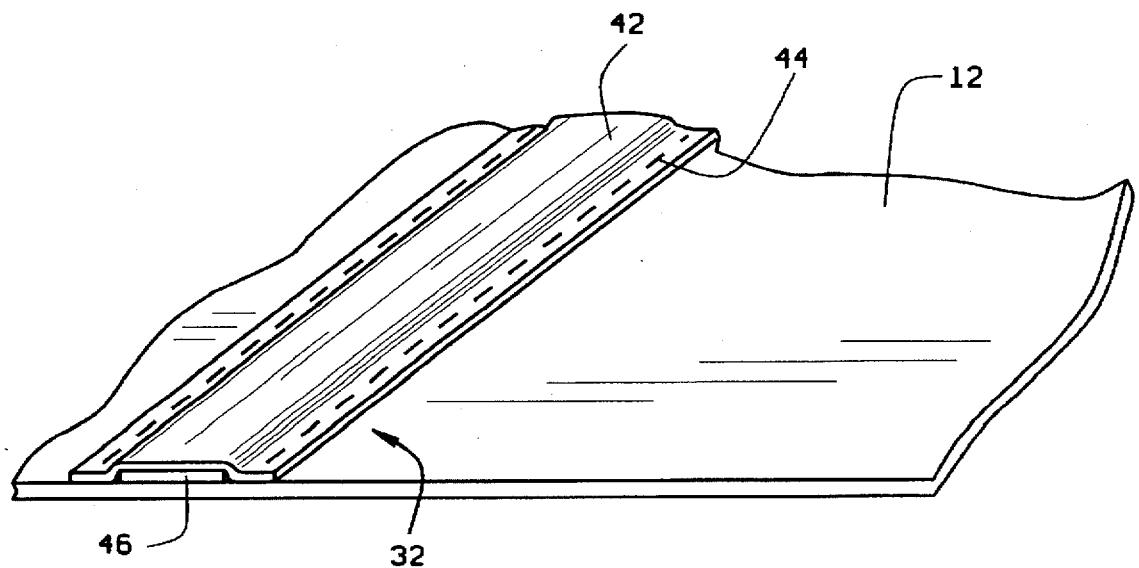
FIG. 4B shows an enlarged isometric cutaway of an alternative form of the typical circuit utilizing printed or painted thick film circuits in lieu of a conductive wire.

Another acceptable method of affixing the circuits 32a,c, e,g and 36a,c,e to the boat cover 12 is shown in FIG. 4B by using a conductive thick film 46, or alternatively, a printed circuit (not shown) would work as well. The thick film 46 or printed circuit is covered with an insulating and preferably abrasion resistant layer 42 and optionally secured further with stitching 44. The circuits 32a,c,e,g and 36a,c,e are coupled to the control box 52 by insulated leads (not shown) run through the boat hem 13 from the terminals 76a-n to the control box 52.

Figure 5:
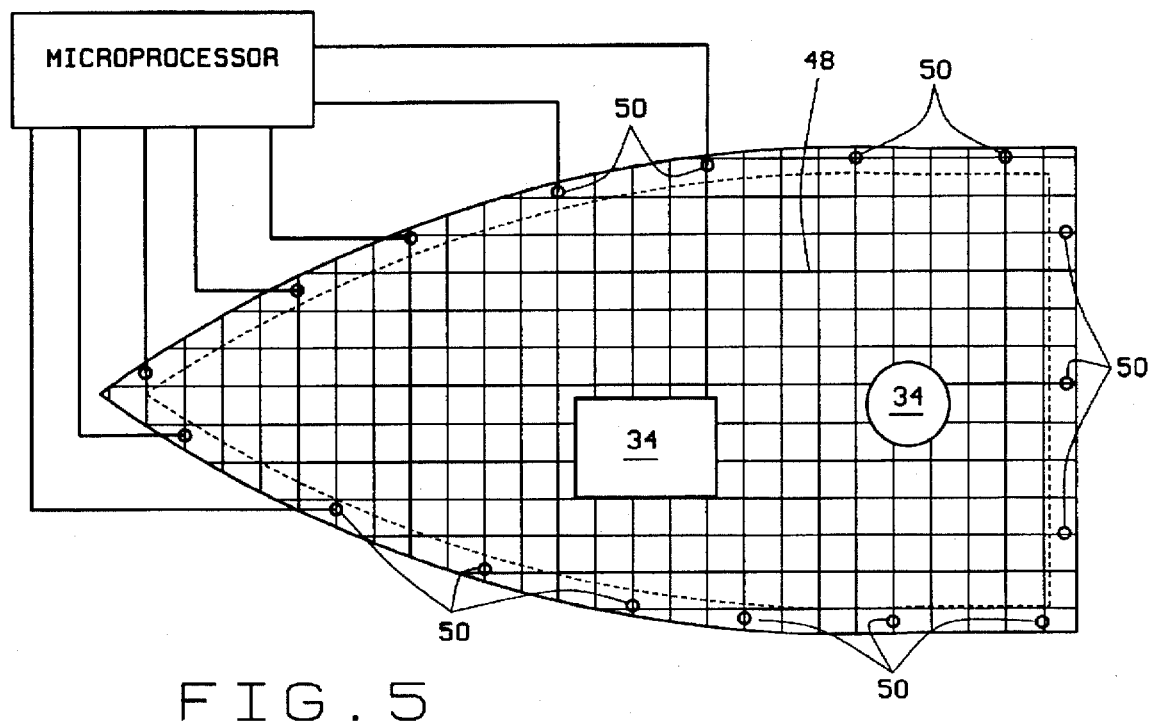
FIG. 5 shows a representation of a conductive grid and electrodes placed on the boat cover.

In the preferred embodiment of the present invention, shown schematically in FIG. 5, conventional circuits are replaced with a conduction grid 48. Several electrodes 50 are placed around the perimeter of the boat cover 12 and coupled to the conduction grid 48. Insulated leads (not shown) are run through the boat hem 13 from the electrodes 50 to the control box 52. A microprocessor 74 located in the control box 52 (FIG. 6) continuously samples and measures the resistance across the conduction gird 48 through each permutation of electrode pairs. If the microprocessor detects a significant programmable change in resistance between any two electrodes, the alarm is triggered. The conduction grid 48 is preferably made of high resistance wire or of a thick film coating such as that sold under the trademark "Electrodag +504" by the Acheson Colloids Company. This high electrical resistance helps prevent the system from being defeated by someone using a jumper between electrodes made of a typically low resistance wire such as copper. Alternatively, the conduction grid 48 may be a plurality of crisscrossing high-resistance wires covering a majority of the surface of the boat cover 12 as shown in FIGS. 3A and 3B.

To account for changes in resistance in the conduction grid 48 over time caused by wear and tear on the boat cover 12, the system will calibrate itself each time it is armed. The microprocessor 74 will measure the initial values of resistance through each permutation of electrode pairs. These values will then be used as a reference point for the system until the next time the system is armed. The microprocessor 74 may also be used to program the requisite change in resistance before triggering the alarm, thus allowing the operator to adjust the sensitivity of the system. Additionally, the microprocessor 74 may be configured to trigger the alarm only when the resistance across the grid 48 changes a certain amount within a given period of time. This allows the system to compensate for changes in the resistance caused by the elements during extended periods of use.

Figure 6:
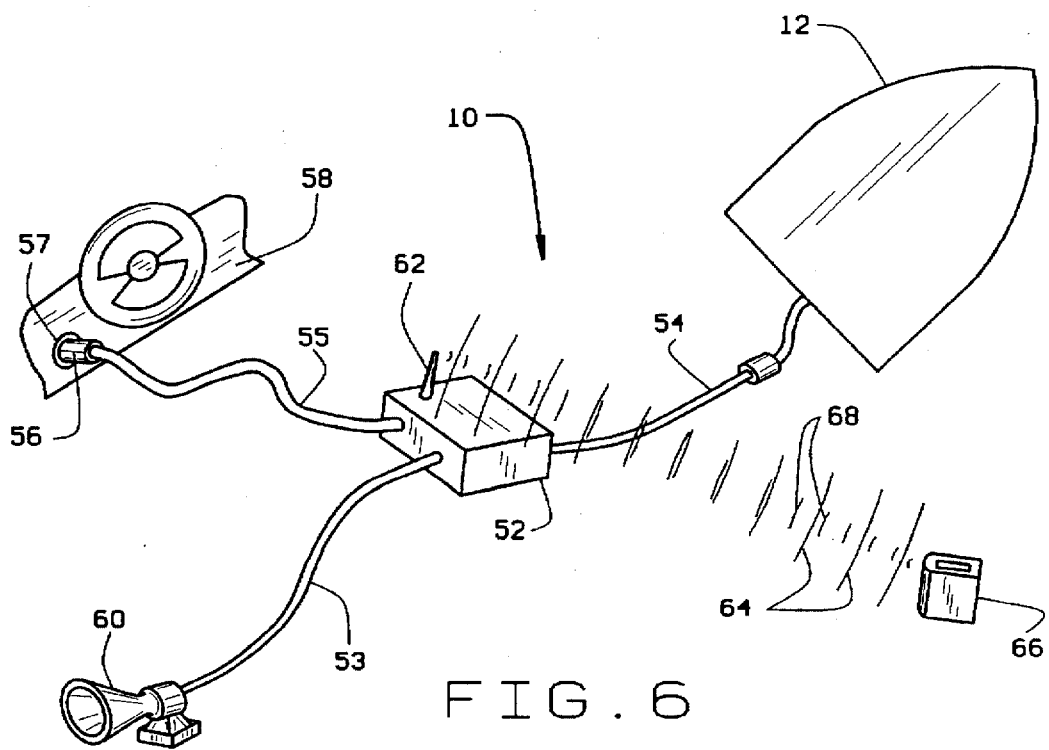
FIG. 6 shows a diagram of the typical present alarm system components and their interconnection.
Figure 7:
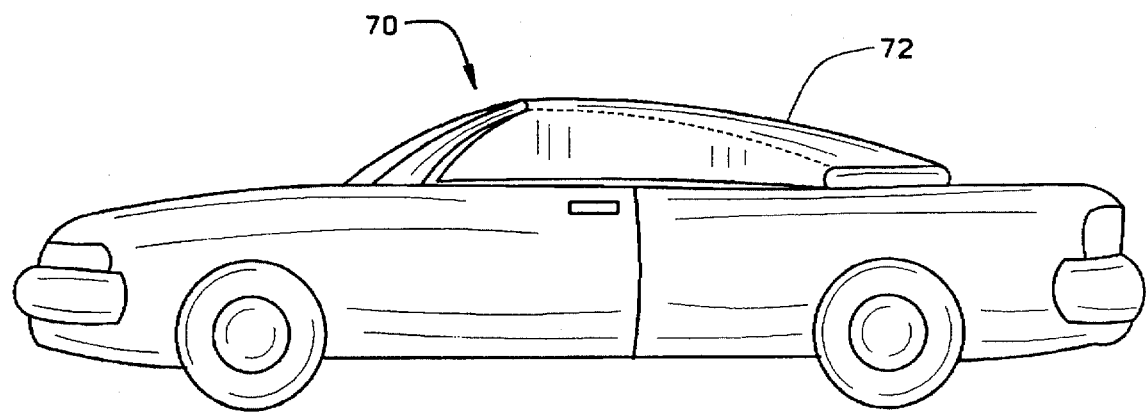
FIG. 7 shows an elevation of a typical convertible automobile.
Figure 8:
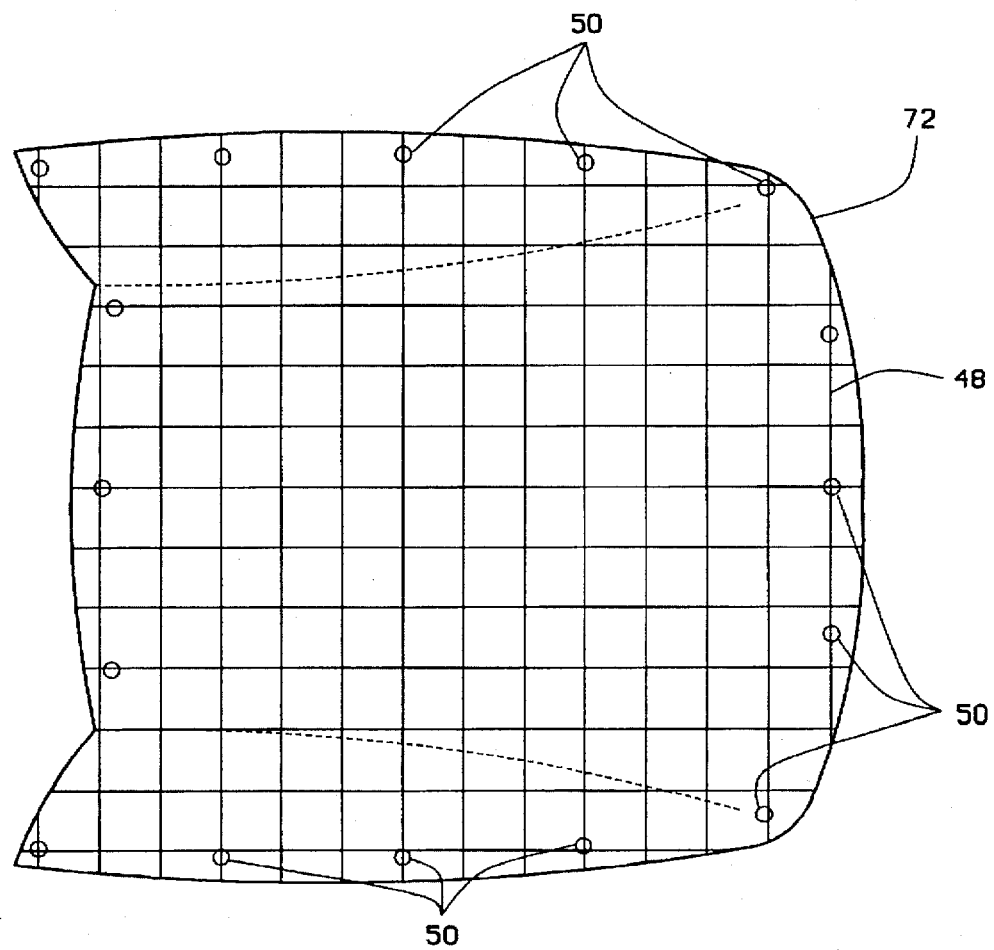
FIG. 8 shows a representation of the conductive grid and electrodes placed on a convertible automobile top.

Referring to FIG. 6, the electronic components of the alarm system 10 may be kept together in a control box 52 regardless of which embodiment is used. The control box 52 may be connected using a cable 54 to the circuits on the boat cover 12. Another cable 55 may be used to connect the control box 52 to a power supply such as a cigarette lighter adapter 56 plugged into a cigarette lighter outlet 57 on the console 58 of the boat or other battery voltage outlet with suitable adapter.

The operator may be notified of an alarm condition by any conventional means such as a siren 60, or the control box 52 may equipped with a small antenna 62 which will send outbound signals 64 to a pager 66 worn by the operator or located with a centralized monitoring system. The pager 66 may also be equipped to transmit signals 68 back to the control box 52 to facilitate remote arming and disarming of the system. In systems without remote arming and disarming, a key switch (not shown) may be placed in the hull of the boat, but such arming methods would require a delay mechanism to allow the operator to both finish covering the boat after arming and to disarm after uncovering the boat. If a siren 60 is used, it may be placed in a more practical location that the control box 52 by using a cable 53 to connect the siren 60 and the control box 52.

The system may also be adapted for use on the top 72 of a convertible automobile 70, or on a cover for a pickup truck bed (not shown). The same kind of conduction grid 48 as used in the preferred embodiment for boat covers is placed on the automobile top 72. Electrodes are placed around the perimeter of the top 72 and the system is operated in the same manner as described for boat covers. In convertible automobiles 70 where no snaps are used for top 72, the perimeter circuit 14 is removed from the system.

While the foregoing is directed to the preferred embodiments of the present invention, other and further embodiments of the invention may be devised without departing from the basic scope thereof, and the scope thereof is determined by the claims which follow.

What is claimed is:

1. An alarm system for a boat cover comprising:

a boat cover made of a flexible material;

a power supply;

an electrical circuit affixed to a surface of said boat cover, said electrical circuit traversing the width or length of the boat cover three of more times, said electrical circuit further coupled to and carrying current from the power supply;

a sensor coupled to said electrical circuit, said sensor determining if said electrical circuit has been opened and providing a signal indicative thereof;

an indicator actuated by said signal to notify an operator that said electrical circuit has been opened; and a switch attached to said power supply, said switch arming and disarming the alarm system.

2. The alarm system of claim 1, further comprising a plurality of electrical circuits affixed to a surface of said boat cover, each said electrical circuit traversing the width or length of the boat cover three or more times, each said electrical circuit further coupled to and carrying current from said power supply, wherein said sensor determines if any one of said electrical circuits has been opened and providing a signal indicative thereof.

3. The alarm system of claim 1, further comprising:
   a perimeter circuit embedded into the hem of said boat cover, said perimeter circuit coupled to and carrying current from said power supply, said perimeter circuit further coupled to said sensor, wherein said sensor determines if said perimeter circuit has been opened and providing a signal indicative thereof; and
   a plurality of snap receptacles adapted to receive male portions of snaps, said snap receptacles coupled to and distributed around said perimeter circuit, said snap receptacles causing electrical discontinuity in said perimeter circuit when the male portion of a snap is removed therefrom.

4. The alarm system of claim 3, wherein said snap receptacles are primarily made of an electrically insulating material and the alarm system further comprises:
   a plurality of electrical contacts molded into each snap receptacle, said electrical contacts connected to said perimeter circuit at one end and contacting the male portion of a snap on another end.

5. The alarm system of claim 3, wherein said perimeter circuit is made of a material with a high electrical resistance.

6. The alarm system of claim 1, further comprising:
   an adhesive component affixed directly to a surface of said boat cover, said adhesive component having adhesive qualities on both sides;
   said electrical circuit affixed to the side of said adhesive component opposite said boat cover; and
   a protectant made of an abrasion resistant and electrically insulating material covering said electrical circuit, said protectant affixed to the side of said adhesive component with said electrical circuit.

7. The alarm system of claim 6, further comprising a plurality of electrical circuits traversing the width or length of the boat cover three or more times, each said electrical circuit further coupled to said sensor, wherein said sensor determines if any one of said electrical circuits has been opened.

8. The alarm system of claim 6, wherein said adhesive component is made of a pressure sensitive material.

9. The alarm system of claim 6, wherein said adhesive component is made of a heat sealing material.

10. An alarm system for a boat cover comprising:
    a boat cover made of a flexible material;
    a power supply;
    a conduction grid made of a high resistance material affixed to a side of said boat cover;
    a plurality of electrodes placed around the perimeter of said boat cover, each electrode being connected to said conduction grid at a different location;
    a control box connected to said power supply and each said electrode individually, said control box sampling and measuring the resistance across said conduction grid between each permutation of electrode pairs and providing a signal indicative of significant changes in said resistance;
    an indicator actuated by said signal to notify an operator that the resistance across any portion of said conduction grid has significantly changed; and
    a switch attached to the power supply, said switch arming and disarming the alarm system.

11. The alarm system of claim 10, wherein said conduction grid is made of high resistance wire.

12. The alarm system of claim 10, wherein said conduction grid is made of a thick film which is slightly electrically conductive.

13. The alarm system of claim 10, further comprising:
    a perimeter circuit embedded into the hem of said boat cover, said perimeter circuit coupled to and carrying current from said power supply;
    a plurality of snap receptacles adapted to receive male portions of snaps, said snap receptacles coupled to and distributed around said perimeter circuit, said snap receptacles causing electrical discontinuity in said perimeter circuit when the male portion of a snap is removed therefrom;
    a sensor coupled to said perimeter circuit, said sensor determining if said perimeter circuit has been broken and providing a signal indicative thereof; and
    said indicator actuated by said sensor signal or said control box signal to notify the operator of either an opening of said perimeter circuit or a significant change in the resistance across any portion of said conductor grid.

14. The alarm system of claim 13, wherein said snap receptacles are primarily made of an electrically insulating material and the alarm system further comprises:
    a plurality of electrical contacts molded into each snap receptacle, said electrical contacts connected to said perimeter circuit at one end and contacting the male portion of a snap on another end.

15. The alarm system of claim 13, wherein said perimeter circuit is made of a material with a high electrical resistance.

16. The alarm system of claim 10, wherein said control box provides a signal indicative of significant changes in said resistance over a programmably determined period of time.

17. An alarm system for a convertible automobile top comprising:
    a top for a convertible automobile, said top made of a flexible material;
    a power supply;
    a conduction grid made of a high resistance material affixed to a said top;
    a plurality of electrodes placed around the perimeter of said top, each electrode being connected to said conduction grid at a different location;
    a control box connected to said power supply and each said electrode individually, said control box sampling and measuring the resistance across said conduction grid between each permutation of electrode pairs and providing a signal indicative of significant changes in said resistance;
    an indicator actuated by said signal to notify an operator that the resistance across any portion of said conduction grid has significantly changed; and
    a switch attached to the power supply, said switch arming and disarming the alarm system.

18. The alarm system of claim 17, wherein said conduction grid is made of high resistance wire.

19. The alarm system of claim 17, wherein said conduction grid is made of a thick film which is slightly electrically conductive.

20. The alarm system of claim 17, wherein said control box provides a signal indicative of significant changes in said resistance over a programmably determined period of time.

21. A snap receptacle switch to fit over a standard male portion of a snap, comprising:

a body, primarily cylindrical in shape, consisting of a top, a bottom, a curved surface, and long axis, said body being made of an electrically insulating material;

a bore in the body along said long axis beginning at said bottom;

a pair of electrical contacts molded into said body, such that one end of each electrical contact protrudes into said bore, and the other end of each electrical contact protrudes from said curved surface of said body;

a plurality of flanges integrated into said body and on said curved surface thereof, said flanges spaced to facilitate installation of said snap receptacle into a hem of a fabric; and a snap cover fitted over said top of said body to keep said snap receptacle in place once installed.

* * * * *